US012756976B2

(12) United States Patent
Kim et al.

(10) Patent No.: US 12,756,976 B2
(45) Date of Patent: Oct. 6, 2026

(54) METHOD AND SYSTEM FOR SUPPORTING WALKING IN VIRTUAL ENVIRONMENT

(71) Applicant: GWANGJU INSTITUTE OF SCIENCE AND TECHNOLOGY, Gwangju (KR)

(72) Inventors: Seung Jun Kim, Gwangju (KR); Seok Hyun Hwang, Gwangju (KR); Young In Kim, Gwangju (KR); Young Seok Seo, Gwangju (KR); Ji Eun Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 139 days.

(21) Appl. No.: 18/783,599

(22) Filed: Jul. 25, 2024

(65) Prior Publication Data

US 2025/0159408 A1 May 15, 2025

(30) Foreign Application Priority Data

Nov. 10, 2023 (KR) ........................ 10-2023-0155898

(51) Int. Cl.
*H04R 3/04* (2006.01)
*H04R 1/02* (2006.01)
*H04R 1/10* (2026.01)

(52) U.S. Cl.
CPC ............... *H04R 3/04* (2013.01); *H04R 1/028* (2013.01); *H04R 1/1008* (2013.01); (Continued)

(58) Field of Classification Search
CPC ........ H04R 3/04; H04R 1/028; H04R 1/1008; H04R 1/1041; H04R 2430/03; H04R 2460/13; H04R 2499/15
See application file for complete search history.

(56) References Cited

U.S. PATENT DOCUMENTS

2007/0012507 A1 1/2007 Lyon
2008/0107300 A1* 5/2008 Chen .................... H04R 1/1075 381/380

(Continued)

FOREIGN PATENT DOCUMENTS

| | | | |
|---|---|---|---|
| CN | 103988113 | A | 8/2014 |
| JP | 2022533953 | A | 7/2022 |
| KR | 1020160007957 | A | 1/2016 |

OTHER PUBLICATIONS

Hwang, Seokhyun et al., "Enhancing Seamless Walking in Virtual Reality: Application of Bone-Conduction Vibration in Redirected Walking", ISMAR 23 SYD Oct. 16-20, 2023 (Oct. 18, 2023).

(Continued)

*Primary Examiner* — Daniel R Sellers

(74) *Attorney, Agent, or Firm* — Scully, Scott, Murphy & Presser, P.C.

(57) ABSTRACT

A method and a system for supporting walking to reduce cyber motion sickness in a virtual environment are provided. There method includes analyzing, for a sound source of content in the virtual environment, a frequency for a sound band of the sound source; separating the sound band of the sound source of the content on the basis of the analyzed frequency and a reference frequency, and transmitting a sound by a bone conduction method to generate a first output signal and a second output signal that have different frequency bands; and outputting the first output signal and the second output signal at different positions through a bone conduction output unit during execution of the content.

11 Claims, 9 Drawing Sheets

(52) U.S. Cl.
CPC ....... *H04R 1/1041* (2013.01); *H04R 2430/03* (2013.01); *H04R 2460/13* (2013.01); *H04R 2499/15* (2013.01)

(56) References Cited

U.S. PATENT DOCUMENTS

| | | | | |
|---|---|---|---|---|
| 2013/0022220 | A1 | 1/2013 | Dong et al. | |
| 2014/0363033 | A1* | 12/2014 | Heiman | H04R 1/46<br>381/151 |
| 2016/0228771 | A1* | 8/2016 | Watson | A63F 13/285 |
| 2023/0089767 | A1* | 3/2023 | Killian | A61N 1/36036 |
| 2024/0267681 | A1* | 8/2024 | Godfrey | H04R 25/606 |

OTHER PUBLICATIONS

Office Action dated May 8, 2025 received in Korean Patent Application No. 10-2023-0155898.
Korean Office Patent Decision dated Jan. 14, 2026 received in Korean Application No. 10-2023-0155898.

* cited by examiner

METHOD AND SYSTEM FOR SUPPORTING WALKING IN VIRTUAL ENVIRONMENT

CROSS REFERENCE TO RELATED APPLICATION

The present application claims priority to Korean Patent Application No. 10-2023-0155898 filed on Nov. 10, 2023, the entire contents of which are incorporated herein by reference for all purposes.

STATEMENT REGARDING PRIOR DISCLOSURES BY THE INVENTOR OR A JOINT INVENTOR

Prior disclosure related to the present application was made by inventors of the present application in journal paper entitled "Enhancing Seamless Walking in Virtual Reality: Application of Bone-Conduction Vibration in Redirected Walking" on Oct. 18, 2023. A copy of the journal paper is provided on a concurrently filed Information Disclosure Statement.

BACKGROUND

Field

The present invention relates to a method and system for supporting walking in a virtual environment.

Description of Related Art

A virtual reality system, which allows a user to perceive a virtual environment as if it were a real happening situation while visually and auditorily feeling the environment through an assistive device such as a head-mounted display (HMD) device, has come into widespread use. However, when using virtual reality, there are many difficulties with prolonged use due to the problem of cyber motion sickness. This cyber motion sickness in virtual reality is caused by a mismatch between visual and vestibular stimuli, in which the user in virtual reality feels that he or she is moving due to visual changes, but he or she actually remains in a stationary state, and the vestibular signals from the vestibular organ, which are crucial for balance, do not get transmitted to the central nervous system. To resolve this cyber motion sickness in virtual reality, there is active research on technologies that provide the user with vestibular stimulation equivalent to visual stimulation. As an example of such technology, Korean Patent No. 10-2016-0007957 discloses a technology associated with a method and system for galvanic vestibular stimulation in a virtual reality environment.

In addition, a motion platform is also being used to solve the problem of cyber motion sickness in a manner that allows the user to experience movement in conjunction with visual effects, which requires high costs and a spacious place. To solve these problems, research is needed on a method to combine a redirection walking technique that allows users of virtual reality to explore a virtual world that is much larger than the tracked real-world workspace with vestibular stimulation to make the users of virtual reality feel less cyber motion sickness even in small spaces.

SUMMARY

The present invention relates to a method and system for supporting walking to reduce cyber motion sickness in a virtual environment.

More specifically, the present invention relates to a method and system for supporting walking using redirection in a virtual environment that reduces cyber motion sickness in a virtual environment by outputting a sound source of content separated by frequency bands to stimulate the vestibular organ of a user.

Further, the present invention relates to a method and system for supporting walking in a virtual environment, in which a whole sound band of a sound source of content is played through a bone conduction output while the full sound range of the content is played through an air stimulation vibration output unit that causes the full sound range of the content to be output to the ear of a user.

To solve the aforementioned objects, there is provided a method of supporting walking in a virtual environment according to the present invention, the method may include analyzing, for a sound source of content in the virtual environment, a frequency for a sound band of the sound source, separating the sound band of the sound source of the content on the basis of the analyzed frequency and a reference frequency, and transmitting a sound by a bone conduction method to generate a first output signal and a second output signal that have different frequency bands, and outputting the first output signal and the second output signal at different positions through a bone conduction output unit during execution of the content.

Further, there is provided a virtual content execution device according to the present invention. The virtual content execution device may include a body unit configured to be worn by a user, a display unit connected to the body unit and configured to output image information on content, and a control unit configured to control an output of the image information, in which the body unit may be provided with a first bone conduction output unit and a second bone conduction output unit that are disposed on two opposite sides with respect to a specific point of the user, and the control unit may control at least one of the first bone conduction output unit or the second bone conduction output unit to output a sound source of the content by a bone conduction method.

Further, there is provided a system for supporting walking in a virtual environment according to the present invention. The system may include a content receiving unit configured to receive content, a control unit configured to analyze a frequency band for a sound band of a sound source of the received content, and to separate a sound band of the sound source of the received content on the basis of the analyzed frequency band and a reference frequency to generate a first output signal and a second output signal for vestibular organ stimulation, and a first bone conduction output unit and a second bone conduction output unit configured to each output the first output signal and the second output signal that have been generated, in which the control unit may generate, as the first output signal, a sound band having a frequency band smaller than a low band reference frequency of the reference frequency among a whole sound band of the sound source of the content, separate, as the second output signal, a sound band having a frequency band greater than a high band reference frequency of the reference frequency among the whole sound band of the content, and adjust at least one of the first output signal and the second output signal on the basis of at least one of a shape and a size of a skull of a user or a structure of a vestibular labyrinth.

As described above, in the method and system for supporting walking in a virtual environment according to the present invention, a sound source of content is separated by frequency bands with reference to a specific frequency and a sound, which stimulates the vestibular organ near the mastoid of a user, is output to the user, thereby maximizing a detection limit in the virtual environment and outputting a high quality sound source of the content while reducing cyber motion sickness.

Further, in the present invention, a whole sound band of content is played through the bone conduction output unit, while the whole sound band of the sound source of the content is played through the air stimulation vibration output unit, which enables the whole sound band of the sound source of the content to be output to a user's ear, thereby solving a problem that the sound is hard to hear, which was a problem in the conventional bone conduction method.

DETAILED DESCRIPTION OF EMBODIMENTS

Figure 1:
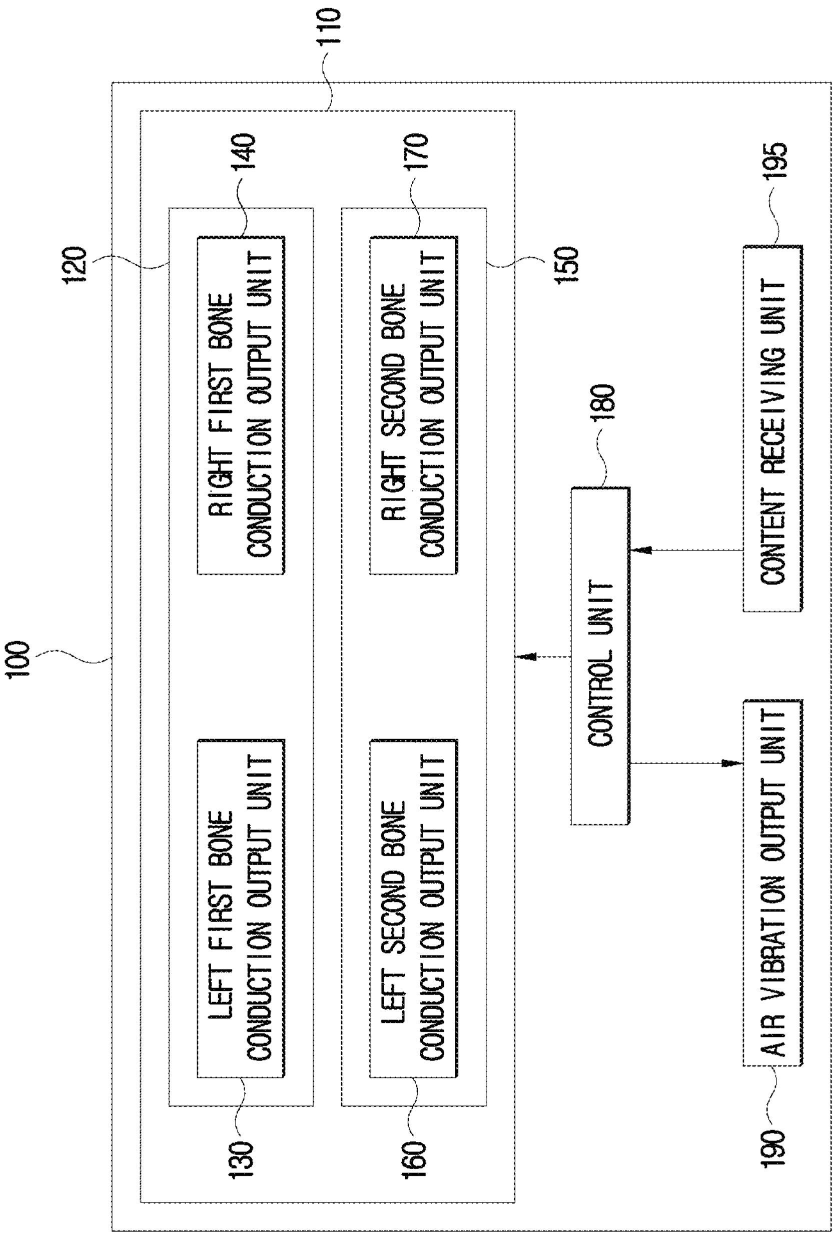
FIG. 1 is a configuration view for describing a system for supporting walking in a virtual environment according to the present invention.

Hereinafter, exemplary embodiments disclosed in the present specification will be described in detail with reference to the accompanying drawings. The same or similar constituent elements are assigned with the same reference numerals regardless of reference numerals, and the repetitive description thereof will be omitted. The suffixes "module", "unit", "part", and "portion" used to describe constituent elements in the following description are used together or interchangeably in order to facilitate the description, but the suffixes themselves do not have distinguishable meanings or functions. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present application, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

The present invention relates to a method and system for supporting walking in a virtual environment that maximizes a difference between a walking direction in a virtual environment and a real walking direction while minimizing cyber motion sickness of a user when a redirection technique that makes a difference between the walking direction in the virtual environment and the real walking direction is applied in order to increase an extent of utilization of a real space in the virtual environment.

Figure 3:
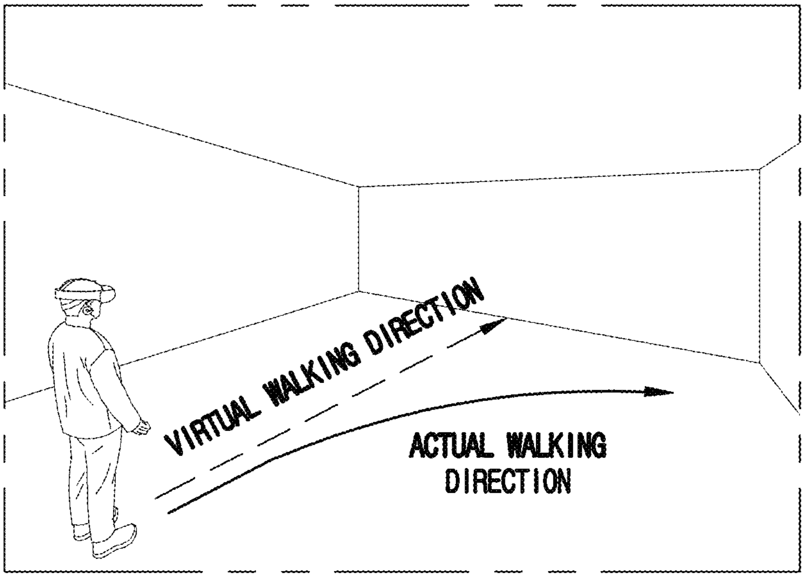
FIG. 3 is an exemplified view illustrating a difference between a walking direction in a virtual environment and a real walking direction.

A redirection method, which enables a user to move in a larger virtual space using the user's natural walking motion even in a small physical space without equipment such as a motion platform when experiencing virtual reality, is a technology that mismatches a user's movement in a physical space with a user's movement in a virtual space to change a user's moving path in a way that redirects the user through an operation applied to a displayed scene, as illustrated in FIG. 3 to cause the user to change his or her position or direction to unconsciously compensate for a scene movement.

That is, the redirection method is a technology that changes the user's walking direction by mapping the real environment with the movement of the environment in virtual reality by modulating the user's movement or the structure of the virtual environment without the user being recognized, in such a way that the user's path in the real world is made into an arc shape through an operation that continuously rotates a map in virtual reality to avoid obstacles when the user enters the virtual environment.

In this case, when the user's walking direction is changed to a wider angle in order to efficiently avoid obstacles, it is necessary to increase the visual manipulation on the walking direction to a level at which the user may perceive this directional mismatch. Therefore, a limit of mismatch between the user's vision and the senses within the vestibular organ is reached that causes cyber motion sickness in the user (In general, maintaining balance in the human body is achieved by the harmonization of a vestibular, visual, and proprioceptive senses, and in particular, related to the vestibular sense, the semicircular canal perceives rotational acceleration and the otolithic organ perceives linear acceleration to transmit the fact that the body is moving to the central nervous system.

For example, when turning to the right, the right semicircular canal is stimulated and the left semicircular canal is inhibited, resulting in a rightward nystagmus, and this signal is transmitted to the cerebellum, which creates the perception of turning to the right. In this case, a vestibulo-ocular reflex is induced in the human body that corresponds to the turning, which keeps the human body in balance. However, the cyber motion sickness in virtual reality is caused by a mismatch between visual and vestibular stimuli, in which the user in virtual reality feels that he or she is moving due to visual changes, but his or her body is actually in a stationary state, and the vestibular signals caused from the vestibular organ, which are crucial for balance, do not get transmitted to the central nervous system.

That is, the modulated visual information due to the application of walking redirection technology causes a mismatch between the user's self-perception and vestibular senses, and when this mismatch increases beyond a certain limit, the user will perceive the redirection manipulation of such a system, resulting in a decrease in senses of immersion and realism in the virtual environment and an increase in cyber motion sickness.

Therefore, a restriction on the range of redirection manipulation that prevents the user from recognizing that the redirection technology is applied in this virtual reality environment is referred to as a detection threshold (DT), which corresponds to a limit value when a user's actual walking path and an expandable range of virtual reality space are manipulated upon applying the redirection.

Meanwhile, as illustrated in FIG. 1, the present invention relates to a system for supporting walking to expand an activity space in the virtual environment while minimizing cyber motion sickness. Hereinafter, a method and system for supporting walking in a virtual environment using the redirection of the present invention along with a concept of the redirection method described above will be more specifically described. FIG. 1 is a configuration view for describing a system for supporting walking in a virtual environment according to the present invention.

Figure 7:
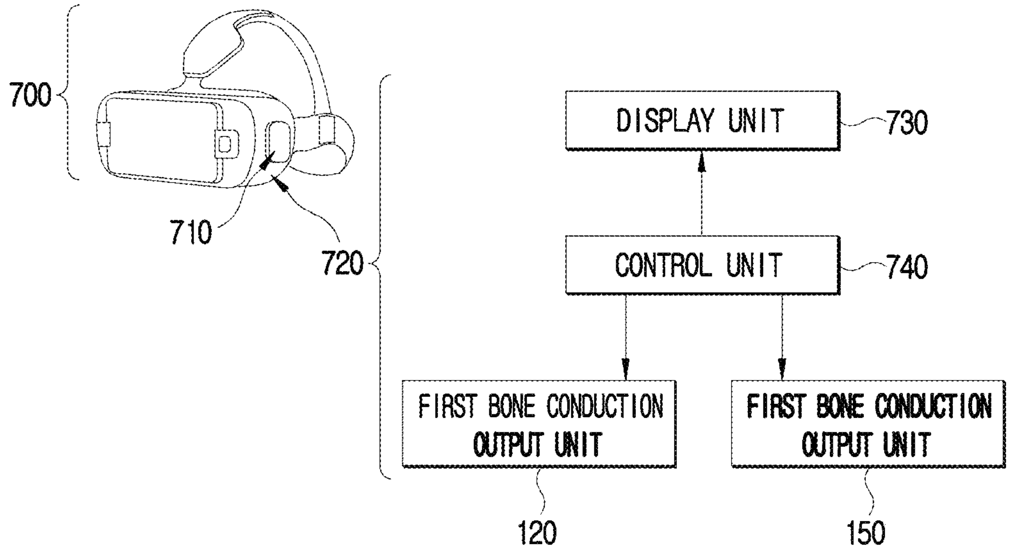
FIG. 7 is a conceptual view for describing a virtual content execution device according to one embodiment of the present invention.

First, as illustrated in FIG. 1, a system 100 for supporting walking in a virtual environment may mean a virtual reality headset itself, as illustrated in FIG. 7, or a device that is attached to the virtual reality headset (that is, the device may be an integrated virtual reality headset in which the system 100 for supporting walking in a virtual environment of the present invention is built-in, or a device implemented to be attached separately to the virtual reality headset in the form of an add-on).

Meanwhile, the system 100 for supporting walking in a virtual environment according to the present invention may include a first bone conduction output unit 120, a second bone conduction output unit 150, a control unit 180, an air vibration output unit 190, and a content receiving unit 195.

Figure 4:
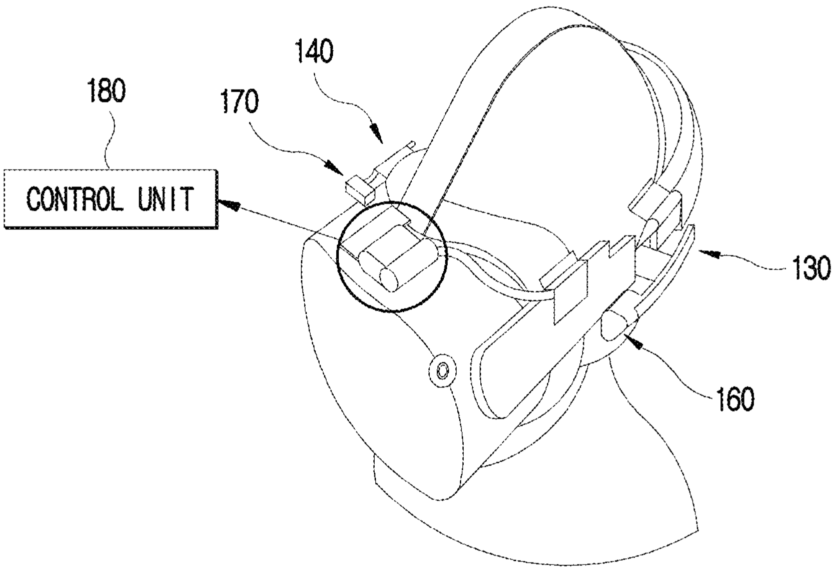
FIG. 4 is a conceptual view for illustrating the system for supporting walking in a virtual environment according to the present invention.
Figure 5:
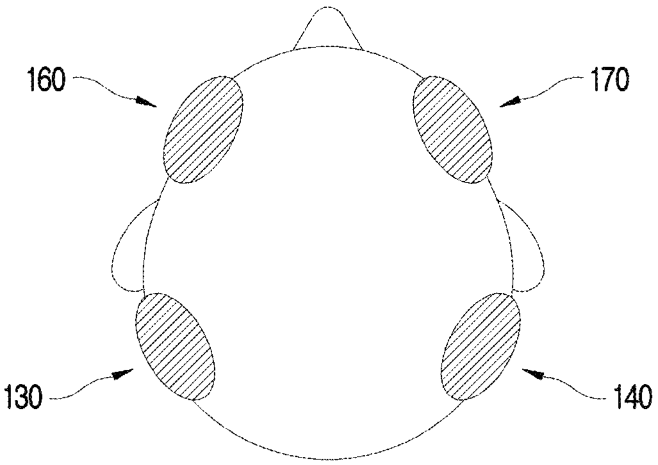
FIG. 5 is a conceptual view for illustrating a position of an output unit of the system for supporting walking in a virtual environment according to the present invention.

The first bone conduction output unit 120 includes a left first bone conduction output unit 130 and a right first bone conduction output unit 140, and outputs an output signal to stimulate the vestibular organ of the user through the vicinity of the mastoid on the left and right sides of the user, respectively, as illustrated in FIGS. 4 and 5 (in this case, the distinction between left and right sides in the present invention hereinafter is made with reference to looking vertically down at the crown of the head of the user wearing the virtual reality headset equipped with the system 100 for supporting walking in a virtual environment of the present invention).

The second bone conduction output unit 150 includes a left second bone conduction output unit 160 and a right second bone conduction output unit 170, and outputs an output signal to stimulate the vestibular organ of the user through the vicinity of the condyle on the left and right sides of the user, respectively, as illustrated in FIGS. 4 and 5.

The output signal that is output through the left first bone conduction output unit 130 and the right first bone conduction output unit 140, and the output signal that is output through the left second bone conduction output unit 160 and the right second bone conduction output unit 170 are generated in the control unit 180 of the present invention on the basis of the content received through the content receiving unit 195. The content receiving unit 195 of the system 100 for supporting walking using the redirection according to the present invention receives content stored in a storage unit (not illustrated) of the virtual reality headset mounted on the system 100 for supporting walking in a virtual environment or received through a communication unit (not illustrated). The content receiving unit 195 of the present invention transmits the received content to the control unit 180 of the system 100 for supporting walking in a virtual environment of the present invention.

The control unit 180 of the present invention includes at least one central processing unit (CPU), and generates output signals to be output to the left first bone conduction output unit 130, the right first bone conduction output unit 140, the left second bone conduction output unit 160, and the right second bone conduction output unit 170 on the basis of a sound source of the content received from the content receiving unit 195 (In general, it is known that sound and vibration produce displacement of fluid in the vestibular labyrinth of the human body, which induces deflection of type 1 vestibular receptor hairs to modulate vestibular information, and output signals are generated on the basis of these characteristics).

The output signals generated by the control unit 180 of the present invention are signals for stimulating the user's vestibular organ through the user's mastoid and/or condyle on the left and right sides, and are generated on the basis of a sound source by frequency band of the sound source of the received content. For example, the control unit 180 may generate a sound having a whole sound band of a sound source of the received content as output signals to be output to the left and right first bone conduction output units 130 and 140 and/or the left and right second bone conduction output units 160 and 170.

Alternatively, the control unit 180 may generate output signals by determining at least one reference frequency (a low band reference frequency, a high band reference frequency, . . . and the like) and dividing a sound band of the content with reference to the reference frequency. In one example, the control unit 180 may generate and output a sound band of a sound source of content having a frequency less than a low band reference frequency (for example, 500 Hz) among the reference frequencies (referred to as a content sound having a low-pitched sound band) to the left and right first bone conduction output units 130 and 140 as an output signal, and generate and output a sound band of a sound source of content having a frequency greater than a high band reference frequency (for example, 1500 Hz) among the reference frequencies (referred to as a content sound having a high-pitched sound band) to the left and right second bone conduction output units 160 and 170 as an output signal.

In this case, the intensity (strength) of the output signal output to the left and right first bone conduction output units 130 and 140 and the left and right second bone conduction output units 160 and 170 may be changed depending on the shape and size of the skull of the user of the virtual reality headset, the structure of the vestibular labyrinth, and the like.

Meanwhile, the control unit 180 of the present invention separately analyzes a background sound having a low-pitched sound band among the sound sources of the received content (for example, a sound of a surrounding environment in a 300 to 500 Hz band, a peripheral sound of a non-player character, and the like) and generates the background sound having a low-pitched sound band as a vestibular stimulation background output signal. Thereafter, the control unit 180 may allow the background sound having a low-pitched sound band to be output to the left and right first bone conduction output units 130 and 140 and/or the left and right second bone conduction output units 160 and 170, alone or in combination with a whole sound band of the sound source of the aforementioned content and/or the sound source of the content having a low-pitched sound band (The intensity of the output signal of the background sound may be changed in conjunction with the intensity of the sound of the content being merged).

In addition, the control unit 180 may output the whole sound band of the sound source of the content to the air vibration output unit 180 (an output signal that is output in this method is referred to as an air vibration output signal). The air vibration output unit 130 is an air-conduction vibrator, for which an example may be a speaker. The air vibration output unit 190 may be installed in a position where a sound having a whole sound band of the sound source of the content is well transmitted to the user's ears in the virtual reality headset. In this case, the intensity (strength) of the air vibration output signal output to the air vibration output unit 190 may be changed depending on the shape and size of the skull of the user of the virtual reality headset, the structure of the vestibular labyrinth, the output signals of the first and second bone conduction output units 120 and 150 described above, and the like.

Meanwhile, another embodiment of the system 100 for supporting walking in a virtual environment according to the present invention may be implemented using Galvanic Vestibular Stimulation (GVS), which is a conductive vestibular stimulation method. The GVS stimulates an inner ear (vestibular system) using a small electric current and is mainly used in research and applications to control balance or body movement.

Figure 2:
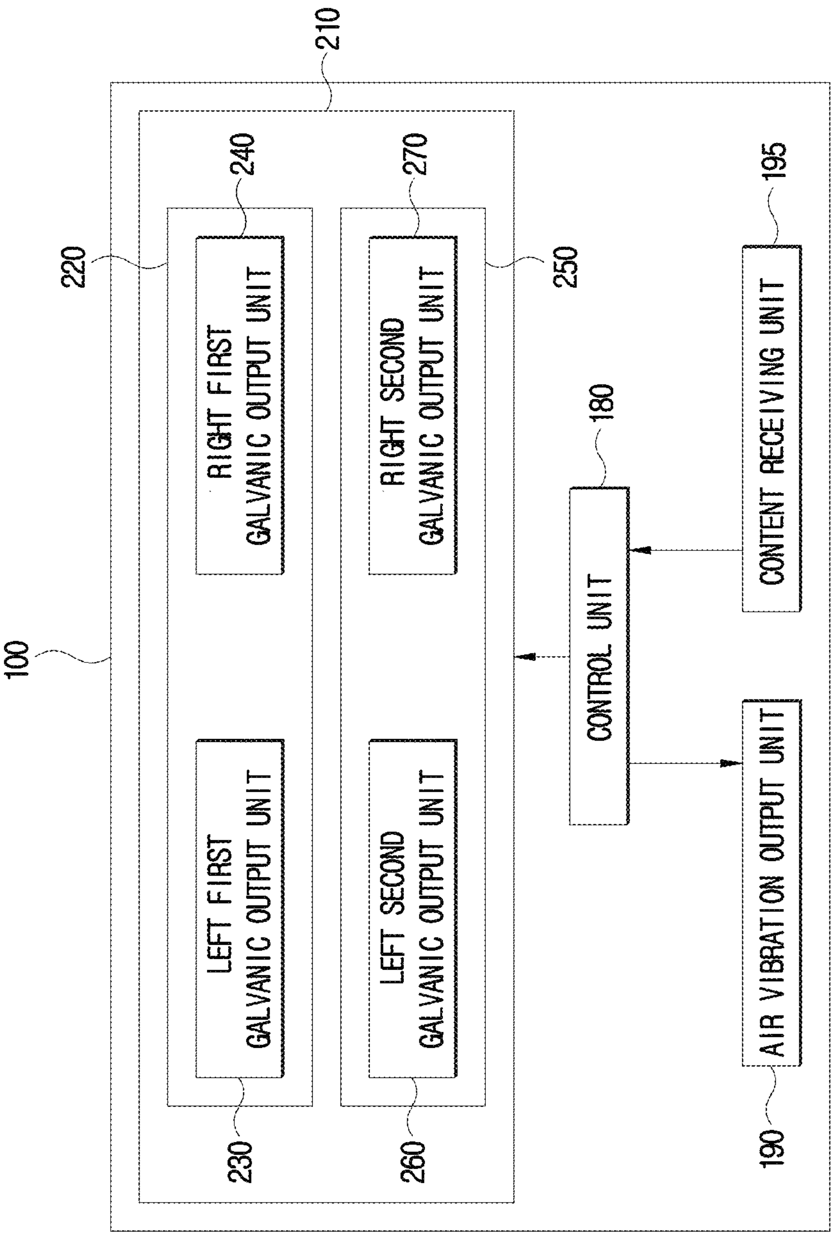
FIG. 2 is a configuration view for describing a system for supporting walking in a virtual environment according to another embodiment of the present invention.

The system 100 for supporting walking in a virtual environment according to another embodiment of the present invention may be implemented as a four-pole GVS method, as illustrated in FIG. 2. In this case, a first galvanic output unit 220 includes a left first galvanic output unit 230 and a right first galvanic output unit 240, and outputs an output signal (which is referred to as a first galvanic output signal) for stimulating a vestibular organ of a user through the vicinity of the mastoid on the left and right sides of the user, respectively, as illustrated in FIG. 4 and FIG. 5.

A second galvanic output unit 250 includes a left second bone conduction output unit 260 and a right second bone conduction output unit 270, and outputs an output signal (which is referred to as a second galvanic output signal) for stimulating a vestibular organ of the user through the vicinity of the condyle of the left and right sides of the user, respectively, as illustrated in FIGS. 4 and 5.

Figure 6:
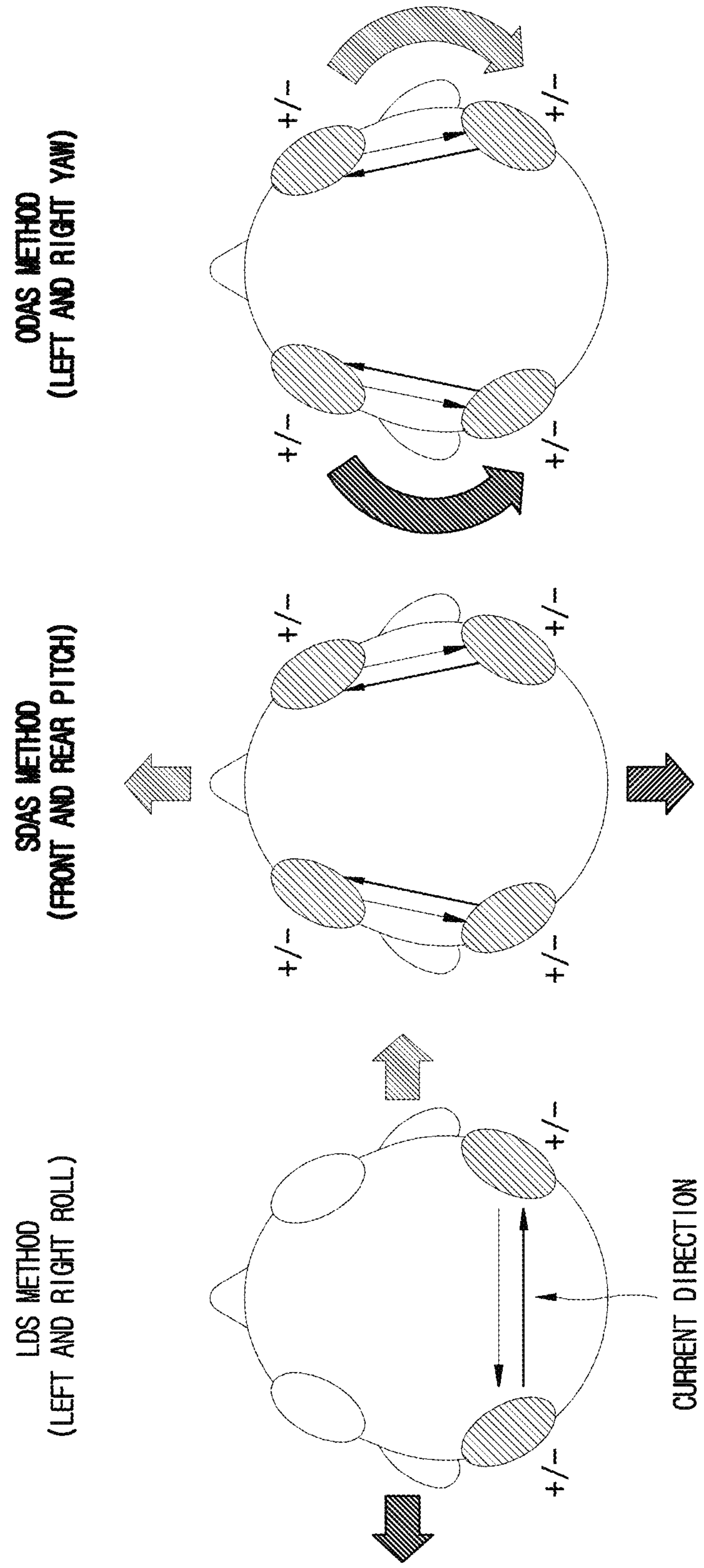
FIG. 6 is a conceptual view for describing an operation of the system for supporting walking in a virtual environment according to another embodiment of the present invention.

A system for supporting walking with a four-pole GVS method according to another embodiment of the present invention regulates galvanic output signals, which are vestibular information for central nerve stimulation, in triaxial directions of roll, pitch, and yaw through four galvanic current outputs to the left and right mastoid (left and right first galvanic output units 230 and 240) and the left and right condyle (left and right second galvanic output units 260 and 270), as illustrated in FIG. 6.

In this case, as illustrated in FIG. 6, the control unit 180 of the present invention generates a galvanic output signal for triaxial modulation of vestibular information through different directional current (complying with a safety standard ±2 mA maximum current) limiting stimuli of lateral directional stimulation (LDS), same directional anteroposterior stimulation (SDAS), and opposite directional anteroposterior stimulation (ODAS).

A virtual reality headset 700 equipped with the system 100 for supporting walking in a virtual environment of the present invention includes a device for executing received content (which is referred to as a virtual content execution device 720). The virtual content execution device 720 of the present invention may include a body unit 710 that is configured to be worn by a user, as illustrated in FIG. 7, and a display unit 730 that is connected to the body unit 710 and outputs image information on content. The display unit 730 of the present invention may be implemented as an image output device in various methods, such as LCD, OLED, and the like.

The body unit 710 of the present invention may be provided with the first bone conduction output unit 120 and the second bone conduction output unit 150 disposed on two opposite sides with respect to a specific point of the user. In this case, the specific point of the user may mean near the mastoid and/or condyle for stimulation of the vestibular organ of the user as described above, but other sites available for stimulation of the vestibular organ are also possible.

In addition, the body unit 710 of the present invention may be provided with the first galvanic output unit 220 and the second galvanic output unit 250 in FIG. 2, which are disposed on two opposite sides with respect to the specific point of the user. In addition, the virtual reality headset 700 of the present invention includes a control unit 740 that controls an output of image information on content, and the control unit 740 may control an output of the first bone conduction output unit 120 and/or the second bone conduction output unit 150 that outputs a sound source of the received content by the bone conduction method described above.

In this case, the control unit 740 of the present invention receives a first output signal and a second output signal having different frequency bands separated from the sound source of the received content, and may output the first output signal through the first bone conduction output unit 120 and the second output signal through the second bone conduction output unit 150 while outputting the image information (which is output in synchronization with the image information being output). Alternatively, the control unit 740 of the virtual content execution device 720 may control to output the first output signal through the first bone conduction output unit 120 and the second output signal through the second bone conduction output unit 150 to the control unit 180 of the system 100 for supporting walking described above while maintaining synchronization with the image information.

In addition, the control unit 740 of the virtual content execution device 720 of the present invention may control the first galvanic output unit 220 and/or the second galvanic output unit 250 that outputs the sound source of the received content in the galvanic method in FIG. 2. In addition, the control unit 740 of the virtual content execution device 720 of the present invention may output the first output signal through the first galvanic output unit 220 and the second output signal through the second galvanic output unit 250 while outputting the image information (which is output in synchronization with the image information being output). Alternatively, the control unit 740 of the virtual content execution device 720 may control to output the first output signal through the first bone conduction output unit 120 and the second output signal through the second bone conduction output unit 150 to the control unit 180 of the system 100 for supporting walking described above while maintaining synchronization with the image information.

Hereinafter, with the configuration described above, a method of supporting walking in a virtual environment in the present invention will be described more specifically with reference to the accompanying drawings.

Figure 8:
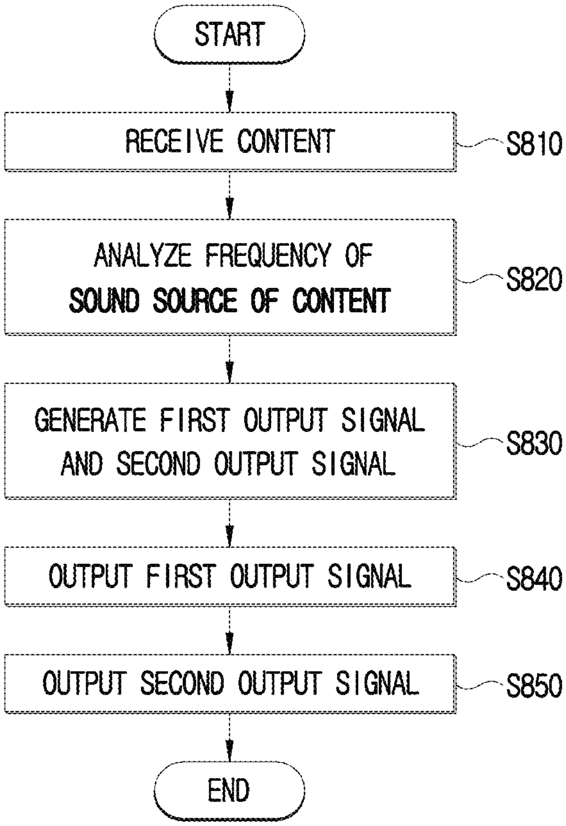
FIG. 8 is a flowchart for describing a method of supporting walking in a virtual environment according to the present invention.
Figure 9:
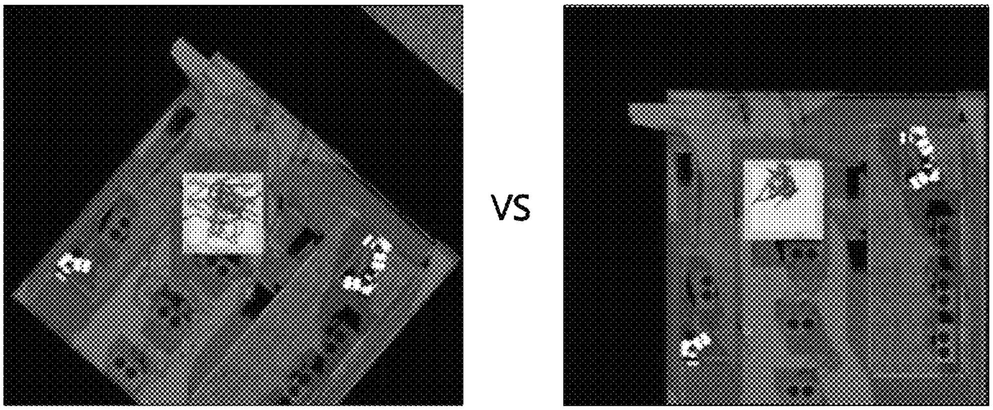
FIG. 9 is conceptual views for describing performance improvement when the method of supporting walking in a virtual environment according to the present invention is applied.

FIG. 8 is a flowchart for describing a method of supporting walking using the redirection according to the system for supporting walking in a virtual environment of the present invention. In addition, FIG. 9 is conceptual views for describing performance improvement when the method of supporting walking in a virtual environment according to the present invention is applied.

First, as illustrated in FIG. 7, in the method of supporting walking in a virtual environment according to the present invention, content to be played in the virtual reality headset is received by the content receiving unit 150 of the system 100 for supporting walking in a virtual environment according to the present invention (S710). As described above, the received content means content stored in the storage unit of the virtual reality headset equipped with the system 100 for supporting walking of the present invention or received through the communication unit (the virtual reality headset in FIG. 7 is equipped with the system 100 for supporting walking in a virtual environment according to the present invention).

The control unit 180 of the present invention receives the content to be played from the content receiving unit 150 and analyzes a frequency band for a sound band of a sound source of the content (S720).

When the frequency band is analyzed in the control unit 180 of the present invention, the frequency band of the sound source of the content may be analyzed through a method that generally uses the Fourier transform to extract a spectrum, which is information on frequency components of a piece of a sound source of a specific time length (which is referred to as a frame).

The control unit 180 of the present invention separates the sound band of the sound source of the received content on the basis of the analyzed frequency band result and a preset reference frequency, and generates a first output signal and a second output signal (S730).

In this case, the control unit 180 may generate a sound band having a frequency band smaller than a low band reference frequency of the reference frequency as the first output signal among a whole sound band of the sound source of the content, and a sound band having a frequency band greater than a high band reference frequency of the reference frequency among the whole sound band of the sound source of the content as the second output signal.

The left first bone conduction output unit 110 and the right first bone conduction output unit 110 of the present invention output the first output signal from the control unit 180 (S740), and the left second bone conduction output unit 160 and the right second bone conduction output unit 170 of the present invention output the second output signal from the control unit 180 (S750).

In this case, the intensity of the output signal output to the left and right first bone conduction output units 110 and 120 and the left and right second bone conduction output units 160 and 170 may be changed depending on the shape and size of the skull of the user of the virtual reality headset, the structure of the vestibular labyrinth, and the like. That is, the control unit 180 may determine whether to output the output signals to the left and right first bone conduction output units 110 and 120 and the left and right second bone conduction output units 160 and 170, and the intensity of the output signals, on the basis of the user's body information input by the user of the virtual reality headset or the user's body information measured by the virtual reality headset.

For example, since the average head shape, size, and the like may be different for each race, such as Westerners and Asians, and the head shape, size, and the like may be different between men and women, old and young, and the like, in consideration of such differences, the control unit 180 of the present invention may control whether to output the output signals to the left and right first bone conduction output units 110 and 120 and the left and right second bone conduction output units 160 and 170 and the intensity of the output signals.

In addition, the control unit 180 of the present invention may receive tilt information and acceleration information from an inertial measurement unit (IMU) sensor included in the virtual reality headset, and, on the basis thereof, identify an operation and a tilt state of the user currently wearing the virtual reality headset. Accordingly, on the basis of the identification, the control unit 180 may control the output and intensity of the first and second output signals to the left and right first bone conduction output units 110 and 120 and the left and right second bone conduction output units 160 and 170.

The IMU sensor is an inertial measurement device, which may measure inertia and accurately measure an angle at which an object is finally tilted. In general, the IMU sensor includes a gyroscope, accelerometer, and geomagnetic sensor. According to the type of IMU sensor, there are 6-axis IMU sensors with only a gyroscope and accelerometer, and 9-axis IMU sensors that include a gyroscope, accelerometer, and geomagnetic sensor. Each IMU sensor measures a physical quantity using inertia, and the gyroscope measures angular velocity (rad/s) of the object to measure a rotational angle (degree) per hour.

In addition, the accelerometer in the IMU sensor may measure the acceleration of an object, which is used to decompose gravitational acceleration to measure how tilted the object is, and derive the object's velocity and distance moved by integrating the measured acceleration.

That is, the control unit 180 of the present invention may control the output and intensity of the first and second output signals to the left and right first bone conduction output units 110 and 120 and the left and right second bone conduction output units 160 and 170 to provide vestibular stimulation in six rotational directions (right/left roll, front/rear pitch, right/left yaw) with respect to the user's head coordinate system on the basis of measurement information obtained from the IMU sensor.

Meanwhile, according to the head orientation of the user wearing the virtual reality headset, the rotational direction of the head coordinate system may not match a rotational direction of an entire coordinate system. For example, when the user wearing the virtual reality headset is facing forward, the lateral directional stimulation (LDS) applies stimulation in a roll rotational direction in a global coordinate system. When the user of the virtual reality headset is looking at the floor, the LDS may, in consideration of the feature of stimulating in a yaw rotational direction in the global coordinate system, track the head direction of the user of the virtual reality headset on the basis of measurement information on the IMU sensor and convert the coordinates to control the output and intensity of the first and second output signals to the left and right first bone conduction output units 110 and 120 and the left and right second bone conduction output units 160 and 170 in a direction desired by the user in the global coordinate system.

As described above, the control unit 180 of the present invention may measure the walking speed, walking direction, tilt and direction of the user wearing the virtual reality headset using the IMU sensor in the virtual reality headset, and adaptively control whether to output the first and second output signals to the left and right first bone conduction output units 110 and 120 and the left and right second bone conduction output units 160 and 170 and the intensity of the first and second output signals on the basis of the measurement results.

That is, according to a state of motion and a tilting degree of the user wearing the virtual reality headset, and the like, the control unit 180 of the present invention may control to output an 80% intensity of the first output signal to the left first bone conduction output unit 110, to output a 20% intensity of the first output signal to the right first bone conduction output unit 120, to output a 60% intensity of the second output signal to the left second bone conduction output unit 160, and to output a 5% intensity of the second output signal to the right second bone conduction output unit 170.

In addition, the control unit 180 of the present invention may allow the whole sound band of the sound source of the content to be output to the left first bone conduction output unit 130, the right first bone conduction output unit 140, the left second bone conduction output unit 160, and the right second bone conduction output unit 170.

In addition, the control unit 180 of the present invention may allow the whole sound band of the sound source of the content or only a portion of the sound band described above to be output only to the left first bone conduction output unit 130 and/or the right first bone conduction output unit 140 (in this case, the sound source of the content may be output to the speaker mounted on the virtual reality headset). In this case, the control unit 180 of the present invention may also control such that the intensity of the first output signal output to the left first bone conduction output unit 130 is different from the intensity of the first output signal output to the right first bone conduction output unit 140.

In addition, the control unit 180 of the present invention may allow the whole sound band of the sound source of the content or only a portion of the sound band described above to be output only to the left second bone conduction output unit 160 and/or the right second bone conduction output unit 170 (in this case, the sound source of the content may be output to the speaker mounted on the virtual reality headset).

In addition, the control unit 180 of the present invention may separately analyze the background sound having a low-pitched sound band among the sound sources of the received content and, on the basis thereof, generate the background sound as a vestibular stimulation background output signal to minimize cyber motion sickness. The background sound having a low-pitched sound band that is analyzed in the control unit 180 of the present invention corresponds to a sound having a low-pitched sound band such as a dialogue sound of a non-player character (NPC), a battle sound, and the like among the sound sources of the content received and analyzed in real time by the control unit 180. The control unit 180 of the present invention may control to output the generated vestibular stimulation background output signal to the left and right first bone conduction output units 130 and 140 and/or the left and right second bone conduction output units 160 and 170 together with the whole sound band and/or the sound source of the content having a low-pitched sound band.

As described above, the method and system for supporting walking in a virtual environment according to the present invention may increase an extent of utilization of a real space in a virtual environment by applying the redirection technique, which makes a difference between the walking direction in the virtual environment and the actual walking direction, while minimizing cyber motion sickness, as illustrated in FIG. 8. That is, as illustrated in FIG. 8, as a result of comparing a case where the present invention is applied and a case where the present invention is not applied, it can be seen that when the present invention is applied, the user experiences less cyber motion sickness and walks much greater spaces and distances in the same virtual environment space.

In addition, the whole sound band of the content is also played through the air-conduction vibrator, which may solve the problem of not being able to hear the sound well when the conventional bone conduction method is used.

Meanwhile, the present invention described above may be executed by one or more processes on a computer and implemented as a program that can be stored on a computer-readable medium (or recording medium).

Further, the present invention described above may be implemented as computer-readable code or instructions on a medium in which a program is recorded. That is, the present invention may be provided in the form of a program.

Meanwhile, the computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices.

Further, the computer-readable medium may be a server or cloud storage that includes storage and that the electronic device is accessible through communication. In this case, the computer may download the program according to the present invention from the server or cloud storage, through wired or wireless communication.

Further, in the present invention, the computer described above is an electronic device equipped with a processor, that is, a central processing unit (CPU), and is not particularly limited to any type.

Meanwhile, it should be appreciated that the detailed description is interpreted as being illustrative in every sense, not restrictive. The scope of the present invention should be determined based on the reasonable interpretation of the appended claims, and all of the modifications within the equivalent scope of the present invention belong to the scope of the present invention. In addition, the aforementioned embodiments are illustrative only and are not intended to limit the scope of the present invention. It will be apparent to those skilled in the art of the present invention from the instruction and suggestion of the present specification that various modifications and alterations within the scope of the technical spirit of the present invention will be possible. For example, the control unit 180 of the system 100 for supporting walking and the control unit 740 of the virtual content execution device 720 may be implemented in one integrated module or in two or more separate devices. Therefore, the scope of protection of the present invention is determined by the description of the appended claims.

What is claimed is:

1. A method of supporting walking in a virtual environment, the method comprising:

analyzing, for a sound source of content in the virtual environment, a frequency for a sound band of the sound source;

separating the sound band of the sound source of the content based on the analyzed frequency and a reference frequency;

generating, as a first output signal, a sound band having a frequency band smaller than a low band reference frequency of the reference frequency among a whole sound band of the sound source of the content;

generating, as a second output signal, a sound band having a frequency band greater than a high band reference frequency of the reference frequency among the whole sound band of the sound source of the content, wherein the first output signal and the second output signal are independently generated based on the analyzed frequency; and outputting the first output signal and the second output signal at different positions through a bone conduction output unit during execution of the content.

2. The method of claim 1, wherein the bone conduction output unit is provided with a first bone conduction output unit and a second bone conduction output unit that are positioned spaced apart from each other along forward and rearward directions of a head, and wherein the outputting of the first and second output signals comprises:

outputting the first output signal through the first bone conduction output unit installed at a first position; and outputting the second output signal through the second bone conduction output unit installed at a second position.

3. The method of claim 2, wherein the first output signal is a signal for vestibular organ stimulation.

4. The method of claim 2, wherein the first position is a position corresponding to a left and right mastoid of a user.

5. The method of claim 4, wherein the outputting of the first output signal through the first bone conduction output unit installed at the first position comprises:

playing a whole sound band of the sound source of the content through the first bone conduction output unit; and playing the whole sound band of the sound source of the content through an air stimulation vibration output unit at a third position corresponding to an ear of the user.

6. The method of claim 4, wherein at least one of the first output signal or the second output signal is adjusted based on at least one of a shape and a size of a skull of the user or a structure of a vestibular labyrinth.

7. The method of claim 2, wherein the second position is a position corresponding to a left and right condyle of a user.

8. A virtual content execution device comprising:

a body unit configured to be worn by a user;

a display unit connected to the body unit and configured to output image information on content; and a control unit configured to control an output of the image information, wherein the body unit is provided with a first bone conduction output unit and a second bone conduction output unit that are disposed on two opposite sides with respect to a specific point of the user, and wherein the control unit is configured to:

analyze, for a sound source of content in a virtual environment, a frequency for a sound band of the sound source;

separate the sound band of the sound source of the content based on the analyzed frequency and a reference frequency;

generate, as a first output signal, a sound band having a frequency band smaller than a low band reference frequency of the reference frequency among a whole sound band of the sound source of the content;

generate, as a second output signal, a sound band having a frequency band greater than a high band reference frequency of the reference frequency among the whole sound band of the sound source of the content, wherein the first output signal and the second output signal are independently generated based on the analyzed frequency; and output the first output signal and the second output signal at different positions via the first and second bone conduction output unit during execution of the content.

9. The virtual content execution device of claim 8, wherein the first bone conduction output unit is disposed in a position corresponding to a mastoid of the user, and the second bone conduction output unit is disposed in a position corresponding to a left and right condyle of the user.

10. A system for supporting walking in a virtual environment, comprising:

a content receiving unit configured to receive content;

a control unit configured to:

analyze, for a sound source of content in the virtual environment, a frequency for a sound band of the sound source;

separate the sound band of the sound source of the content based on the analyzed frequency and a reference frequency;

generate, as a first output signal, a sound band having a frequency band smaller than a low band reference frequency of the reference frequency among a whole sound band of the sound source of the content;

generate, as a second output signal, a sound band having a frequency band greater than a high band reference frequency of the reference frequency among the whole sound band of the sound source of the content, wherein the first output signal and the second output signal are independently generated based on the analyzed frequency; and a first bone conduction output unit and a second bone conduction output unit configured to each output the first output signal and the second output signal that have been generated.

11. The system of claim 10, wherein the control unit is further configured to adjust at least one of the first output signal and the second output signal based on at least one of a shape and a size of a skull of a user or a structure of a vestibular labyrinth.

* * * * *